US012693725B2

(12) United States Patent
Sperling et al.

(10) Patent No.: US 12,693,725 B2
(45) Date of Patent: Jul. 28, 2026

(54) GLOBAL PROCESSOR CORE VOLTAGE CONTROL THROUGH INTEGRATED VOLTAGE REGULATION

(71) Applicant: INTERNATIONAL BUSINESS MACHINES CORPORATION, Armonk, NY (US)

(72) Inventors: Michael Sperling, Poughkeepsie, NY (US); William V. Huott, Holmes, NY (US); Justin Henspeter, Georgetown, TX (US); Sungjun Chun, Poughkeepsie, NY (US); Luke L. Jenkins, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/626,416

(22) Filed: Apr. 4, 2024

(65) Prior Publication Data

US 2025/0315098 A1 Oct. 9, 2025

(51) Int. Cl.
*G06F 1/26* (2006.01)
*G06F 1/32* (2019.01)
*G06F 1/3296* (2019.01)

(52) U.S. Cl.
CPC ................................. *G06F 1/3296* (2013.01)

(58) Field of Classification Search
CPC ...................................................... G06F 1/3296
See application file for complete search history.

(56) References Cited

U.S. PATENT DOCUMENTS

| | | | |
|---|---|---|---|
| 8,129,973 B2 * | 3/2012 | Xi | H02M 3/156 |
| | | | 323/284 |
| 10,097,091 B1 | 10/2018 | Huang et al. | |
| 11,803,224 B2 | 10/2023 | Li et al. | |
| 2003/0120958 A1 * | 6/2003 | Zhang | G06F 1/3203 |
| | | | 713/300 |
| 2012/0250443 A1 * | 10/2012 | Saraswat | G06F 1/3287 |
| | | | 365/226 |
| 2020/0204067 A1 * | 6/2020 | Dabral | G05F 3/10 |
| 2021/0018971 A1 * | 1/2021 | Rotem | G06F 1/263 |
| 2022/0021323 A1 * | 1/2022 | Hogan | H02J 3/46 |

OTHER PUBLICATIONS

Anonymous, "Method for Monitoring and Providing Power Fault Protection in a Multiprocessor System Powered by Multiple Voltage Regulator Modules," an IP.com Prior Art Database Technical Disclosure, IP.com No. IPCOM000126452D, IP.com Electronic Publication Date: Jul. 18, 2005, 8 pages.

(Continued)

*Primary Examiner* — Mohammed H Rehman
(74) *Attorney, Agent, or Firm* — Onyx IP Group

(57) ABSTRACT

Global processor core voltage control through integrated voltage regulation includes outputting, from an integrated voltage regulator to a processor core based on a global input voltage, a regulator output voltage. A power efficiency monitor and control circuit receives voltage control parameters from the integrated voltage regulator. The power efficiency monitor and control circuit controls a global voltage regulator based on the received voltage control parameters to cause an adjustment to the global input voltage.

20 Claims, 3 Drawing Sheets

(56)  References Cited

OTHER PUBLICATIONS

Bai et al., "Voltage Regulator Efficiency Aware Power Management," ASPLOS '17: Proceedings of the Twenty-Second International Conference on Architectural Support for Programming Languages and Operating Systems, Apr. 8-12, 2017, Xi'an, China, https://doi.org/10.1145/3037697.3037717, Published Apr. 4, 2017, 14 pages.

Bondade et al., "Hardware-Software Co-Design of an Embedded Power Management Module with Adaptive On-Chip Power Processing Schemes," Published in: Proceedings of 2010 IEEE International Symposium on Circuits and Systems, Date of Conference: May 30-Jun. 2, 2010, Date Added to IEEE Xplore: Aug. 3, 2010, DOI: 10.1109/ISCAS.2010.5537515, 4 pages.

* cited by examiner

100

300

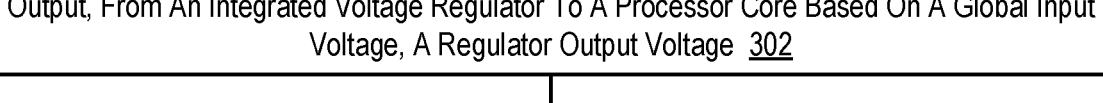

Output, From An Integrated Voltage Regulator To A Processor Core Based On A Global Input Voltage, A Regulator Output Voltage  302

Receive, By A Power Efficiency Monitor And Control Circuit From The Integrated Voltage Regulator, Voltage Control Parameters 304

Control A Global Voltage Regulator With The Power Efficiency Monitor And Control Circuit Based On The Received Voltage Control Parameters To Cause An Adjustment To The Global Input Voltage 306

FIG. 3

GLOBAL PROCESSOR CORE VOLTAGE CONTROL THROUGH INTEGRATED VOLTAGE REGULATION

BACKGROUND

The present disclosure relates to methods, apparatus, and products for global processor core voltage control through integrated voltage regulation.

SUMMARY

According to embodiments of the present disclosure, various methods, apparatus and products for global processor core voltage control through integrated voltage regulation are described herein. In some aspects, global processor core voltage control through integrated voltage regulation includes outputting, from an integrated voltage regulator to a processor core based on a global input voltage, a regulator output voltage. A power efficiency monitor and control circuit receives voltage control parameters from the integrated voltage regulator. The power efficiency monitor and control circuit controls a global voltage regulator based on the received voltage control parameters to cause an adjustment to the global input voltage.

BRIEF DESCRIPTION OF THE DRAWINGS

FIG. 3 sets forth a flowchart of an example method for global processor core voltage control through integrated voltage regulation according to aspects of the present disclosure.

DETAILED DESCRIPTION

Figure 1:
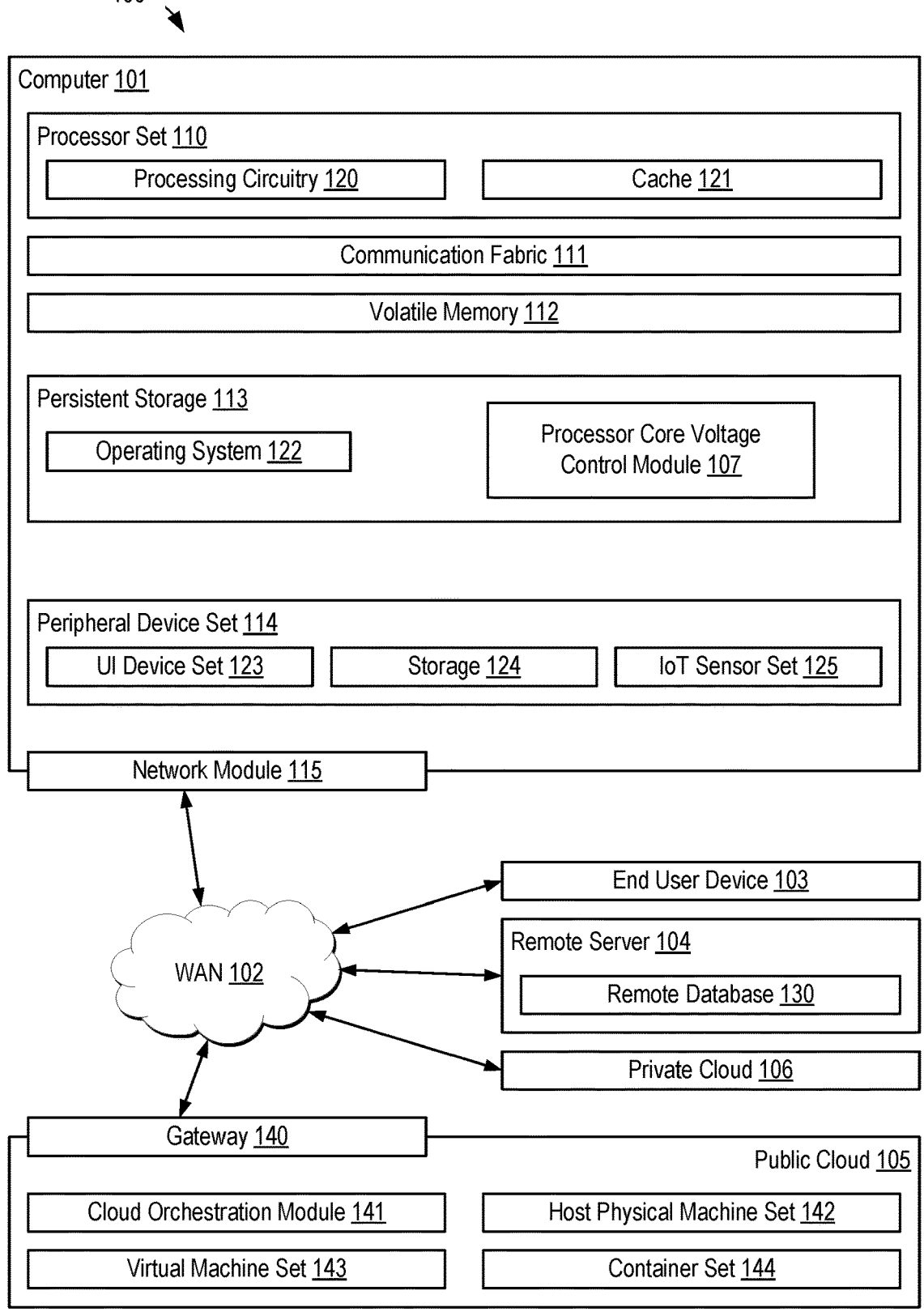
FIG. 1 sets forth an example computing environment according to aspects of the present disclosure.

In general, a voltage regulator is a circuit that is designed to maintain a constant output voltage level as operating conditions change over time. That is, the voltage regulator may be an electronic device or system designed to receive an input voltage and automatically maintain a constant voltage level on one or more output terminals. Depending on the design, a voltage regulator can be used to regulate one or more alternating current (AC) or direct current (DC) voltages. Voltage regulators can be included in electronic devices such as, for example, computer power supplies where they can be used to stabilize DC voltages used to supply power to electronic components such as processor(s), memory devices, and other types of integrated circuits (ICs).

There are several types of voltage regulators such as, for example, switching regulators, linear regulators, and cascaded regulators that may include both switching and linear regulators in a cascaded architecture. One particular type of linear regulator is a low dropout (LDO) regulator. An LDO regulator is a DC linear voltage regulator that may regulate the output voltage even when the supply voltage is close to the output voltage. That is, the LDO regulator may maintain voltage regulation with small differences between supply voltage and load voltage. Another type of voltage regulator is a buck switching regulator (e.g., a step-down regulator circuit). The buck switching regulator is a type of switch mode power supply circuit designed to efficiently reduce DC voltage from a higher voltage to a lower voltage. The choice of the type of regulators to be used may depend on the environment or system in which the regulators will be employed.

In computer system power delivery, there may be a large step down in voltage preceding the processor. It may also be desirable to have local voltage regulation on a per processor core/chiplet basis for performance and efficiency reasons. This approach avoids an excessive number of low voltage regulators at the system level. Providing several independent low voltage regulators at a system level can be complicated, costly and reach theoretical limits as processors split into many chips creating a module, with each chip having unique core voltage and redundancy regulation phases. Also, integrated voltage regulator efficiency will vary non-linearly depending on the load current and input versus output voltage of each integrated voltage regulator. As a result, dynamic optimization of the global input voltage, Vin, fed to all processor core/chiplet voltage regulators, is helpful for overall system power efficiency.

Some examples disclosed herein are directed to a dynamic monitoring and control method across a plurality of processor cores/chiplets at the system/board/module level to adjust the global Vin and other voltage regulator parameters for overall power efficiency optimization. In some examples, the operating conditions for a plurality of processor cores/chiplets are continuously monitored by a power efficiency monitor/controller (PEMC) and the most efficient global Vin and downstream voltage regulation parameters are dynamically and algorithmically adjusted across all processor cores/chiplets. Some examples allow for the dynamic control of the global Vin, monitoring of the processor core/chiplet input voltage (i.e., core/chiplet voltage regulator output voltage), input current drawn from each individual processor core/chiplet voltage regulator by each individual processor core/chiplet, along with processor core/chiplet voltage regulator input current and feedback information from each processor core/chiplet voltage regulator by the PEMC. This information is used to determine the weighted efficiency of each processor core/chiplet voltage regulator, at each processor core/chiplet, in real time. Each processor core/chiplet may still dynamically adjust its own voltage regulator output voltage as needed (e.g., based on workload and silicon process), while the PEMC may dynamically vary Vin (and other voltage regulator operational parameters) for optimizing overall system conversion efficiency across the sum of all processor cores/chiplets within a system.

Some examples disclosed herein provide a feedback control system for dynamic global Vin adjustment that allows for cost optimized and power optimized processor core/chiplet voltage power supplies. Some examples provide power efficiency optimization based on the combined weighted efficiency of a plurality of processor cores/chiplets within a system. In some examples, the centralized PEMC interfaces with a system voltage regulator and a plurality of integrated voltage regulators within one or multiple processors.

Some examples disclosed herein are directed to an apparatus for global processor core voltage control through integrated voltage regulation. The apparatus includes a processor core/chiplet. The apparatus includes an integrated voltage regulator coupled to the processor core, wherein the integrated voltage regulator receives an output voltage from the processor core. The apparatus includes a power efficiency monitor/controller coupled to the integrated voltage regulator through a bidirectional bus, wherein the power efficiency monitor/controller receives a plurality of voltage control parameters from the integrated voltage regulator, and wherein the voltage control parameters include ampere input and output and voltage input and output. The apparatus includes a global voltage regulator coupled to the power efficiency monitor/controller to receive global voltage in, global Vin, instructions for one or more downstream processor cores.

Some examples disclosed herein are directed to a computer system for global processor core voltage control through integrated voltage regulation. The computer system includes a processor core/chiplet; an integrated voltage regulator; a power efficiency monitor/controller; a global voltage regulator; and a memory. The computer system includes instructions stored on the memory executable by the processor core/chiplet to perform one or more operations, the operations comprising: monitoring one or more operating conditions of the processor core/chiplet, wherein the one or more operating conditions comprises voltage in/out and ampere in/out; and adjusting, dynamically a downstream voltage parameter for the processor core/chip, based on the one or more operating conditions.

Some examples disclosed herein provide the ability to selectively operate on-chip integrated voltage regulators in an efficient manner to accomplish a simplified and effective system regulation scheme. Some examples provide a global voltage to integrated voltage regulators, rather than an individual voltage to each individual integrated voltage regulator, which substantially reduces the number of external regulators, and frees up space and reduces cost. Some examples provide global control for power management across multiple dies, and provide the ability to intelligently lower the global voltage based on the capabilities of the integrated voltage regulators and the needs of the processor cores/chiplets. The controller may span multiple integrated circuits (e.g., processor dies, etc.), and the techniques are not limited to a particular type of regulator. Some examples provide advanced control over the type of regulation being performed and a regulation setpoint, as well as being able to tune both the input voltage and output voltage of the integrated voltage regulators. Some examples provide higher efficiency from being able to send in a higher voltage to multiple dies, and the flexibility to choose between multiple types of regulation. Some examples provide optimization of the input voltage across multiple integrated voltage regulators, leading to higher efficiency. Some examples save power, cost, physical space, reduce system cooling requirements, simplify mechanical design, and provide other benefits.

An example of the present disclosure is directed to a method for global processor core voltage control through integrated voltage regulation, which includes outputting, from an integrated voltage regulator to a processor core based on a global input voltage, a regulator output voltage. The method includes receiving, by a power efficiency monitor and control circuit from the integrated voltage regulator, voltage control parameters. The method includes controlling a global voltage regulator with the power efficiency monitor and control circuit based on the received voltage control parameters to cause an adjustment to the global input voltage.

Examples of the method include various technical features that yield technical effects that provide various improvements to computer technology. For instance, some examples include the technical features of receiving, by a power efficiency monitor and control circuit from the integrated voltage regulator, voltage control parameters; and controlling a global voltage regulator with the power efficiency monitor and control circuit based on the received voltage control parameters to cause an adjustment to the global input voltage. These technical features yield the technical effect of avoiding an excessive number of low voltage regulators at the system level, and providing simplified and effective system regulation with dynamic optimization of the global input voltage fed to processor core integrated voltage regulators.

In some examples of the method, the voltage control parameters include current input and output and voltage input and output of the integrated voltage regulator. The method may further include receiving, by the integrated voltage regulator and the power efficiency monitor and control circuit from the processor core, a command indicating a desired regulator output voltage; and controlling the global voltage regulator with the power efficiency monitor and control circuit based on the voltage control parameters and the command indicating a desired regulator output voltage to cause the adjustment to the global input voltage.

The method may further include outputting, by the power efficiency monitor and control circuit to the integrated voltage regulator, operational parameters for the integrated voltage regulator. In some examples of the method, the voltage control parameters and operational parameters are exchanged between the power efficiency monitor and control circuit and the integrated voltage regulator via a bidirectional bus.

In some examples of the method, the integrated voltage regulator, processor core, and power efficiency monitor and control circuit are implemented in a processor module, and the global voltage regulator is external to the processor module. In some examples of the method, the power efficiency monitor and control circuit performs a global efficiency analysis based on the received voltage control parameters to determine the adjustment to the global input voltage.

The method may further include outputting, from each of a plurality of integrated voltage regulators to a respective one of a plurality of processor cores based on the global input voltage, a respective regulator output voltage; receiving, by the power efficiency monitor and control circuit from each of the integrated voltage regulators, respective voltage control parameters; and controlling the global voltage regulator with the power efficiency monitor and control circuit based on the received voltage control parameters from each of the integrated voltage regulators to cause the adjustment to the global input voltage.

Another example of the present disclosure is directed to an apparatus for global processor core voltage control through integrated voltage regulation, which includes an integrated voltage regulator to output a regulator output voltage to a processor core based on a global input voltage. The apparatus includes a power efficiency monitor and control circuit to receive voltage control parameters from the integrated voltage regulator, and control a global voltage regulator based on the received voltage control parameters to cause an adjustment to the global input voltage.

Examples of the apparatus include various technical features that yield technical effects that provide various improvements to computer technology. For instance, some examples include the technical features of a power efficiency monitor and control circuit to receive voltage control parameters from the integrated voltage regulator, and control a global voltage regulator based on the received voltage control parameters to cause an adjustment to the global input voltage. These technical features yield the technical effect of avoiding an excessive number of low voltage regulators at the system level, and providing simplified and effective system regulation with dynamic optimization of the global input voltage fed to processor core integrated voltage regulators.

In some examples of the apparatus, the voltage control parameters include current input and output and voltage input and output of the integrated voltage regulator. In some examples of the apparatus, the integrated voltage regulator and the power efficiency monitor and control circuit are to receive from the processor core a command indicating a desired regulator output voltage, and the power efficiency monitor and control circuit is to control the global voltage regulator based on the voltage control parameters and the command indicating a desired regulator output voltage to cause the adjustment to the global input voltage.

In some examples of the apparatus, the power efficiency monitor and control circuit is to output to the integrated voltage regulator, operational parameters for the integrated voltage regulator. In some examples of the apparatus, the voltage control parameters and operational parameters are exchanged between the power efficiency monitor and control circuit and the integrated voltage regulator via a bidirectional bus.

In some examples of the apparatus, the integrated voltage regulator, processor core, and power efficiency monitor and control circuit are implemented in a processor module, and the global voltage regulator is external to the processor module. In some examples of the apparatus, the power efficiency monitor and control circuit performs a global efficiency analysis based on the received voltage control parameters to determine the adjustment to the global input voltage.

The apparatus may further include a plurality of integrated voltage regulators to output a respective regulator output voltage to a respective one of a plurality of processor cores based on the global input voltage, and the power efficiency monitor and control circuit is to receive from each of the integrated voltage regulators, respective voltage control parameters, and the power efficiency monitor and control circuit is to control the global voltage regulator based on the received voltage control parameters from each of the integrated voltage regulators to cause the adjustment to the global input voltage.

Another example of the present disclosure is directed to a system for global processor core voltage control through integrated voltage regulation, which includes a global voltage regulator to generate a global input voltage, and a processor module coupled to the global voltage regulator. The processor module includes one or more processor cores. The processor module includes one or more integrated voltage regulators to output a regulator output voltage to a respective one of the one or more processor cores based on the global input voltage. The processor module includes a power efficiency monitor and control circuit to receive voltage control parameters from the one or more integrated voltage regulators, and control the global voltage regulator based on the received voltage control parameters to cause an adjustment to the global input voltage.

Examples of the system include various technical features that yield technical effects that provide various improvements to computer technology. For instance, some examples include the technical features of a power efficiency monitor and control circuit to receive voltage control parameters from the one or more integrated voltage regulators, and control the global voltage regulator based on the received voltage control parameters to cause an adjustment to the global input voltage. These technical features yield the technical effect of avoiding an excessive number of low voltage regulators at the system level, and providing simplified and effective system regulation with dynamic optimization of the global input voltage fed to processor core integrated voltage regulators.

In some examples of the system, the one or more processor cores include a plurality of processor cores, the one or more integrated voltage regulators include a plurality of integrated voltage regulators, and the voltage control parameters include current input and output and voltage input and output of the plurality of integrated voltage regulators.

In some examples of the system, the one or more integrated voltage regulators and the power efficiency monitor and control circuit are to receive from the one or more processor cores a command indicating a desired regulator output voltage, and the power efficiency monitor and control circuit is to control the global voltage regulator based on the voltage control parameters and the command indicating a desired regulator output voltage to cause the adjustment to the global input voltage.

In some examples of the system, the power efficiency monitor and control circuit is to output to the one or more integrated voltage regulators, operational parameters for the one or more integrated voltage regulators.

FIG. 1 sets forth an example computing environment 100 according to aspects of the present disclosure. Computing environment 100 contains an example of an environment for the execution of at least some of the computer code involved in performing the various methods described herein, such as processor core voltage control module 107. Functionality of processor core voltage control module 107 may be implemented in hardware, software, or a combination of hardware and software, and may be distributed throughout various blocks of computing environment 100, including within processor set 110. In addition to processor core voltage control module 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and processor core voltage control module 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in processor core voltage control module 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in processor core voltage control module 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
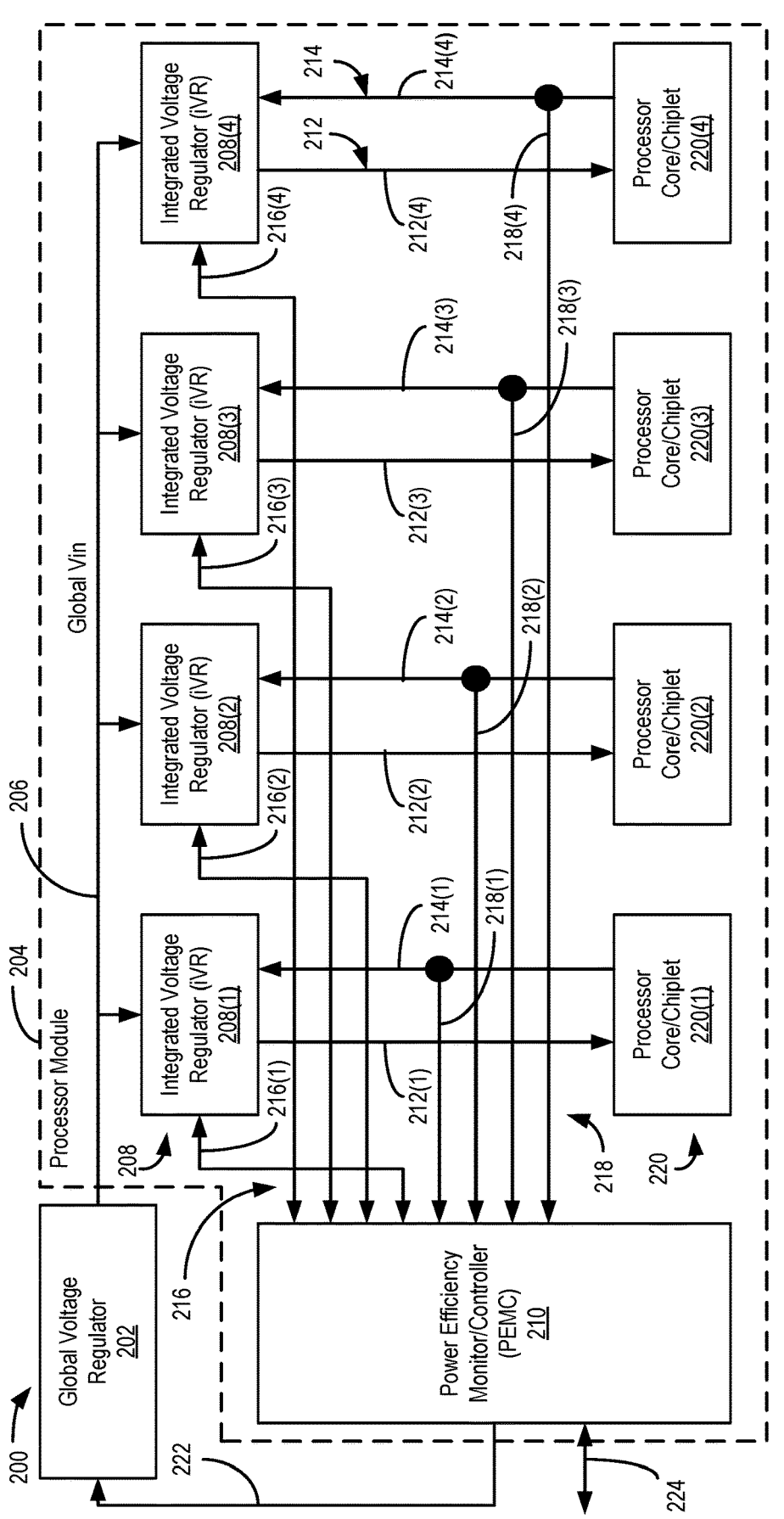
FIG. 2 sets forth example processing circuitry according to aspects of the present disclosure.

FIG. 2 sets forth example processing circuitry 200 according to aspects of the present disclosure. Processing circuitry 200 is an example of processing circuitry 120 (FIG. 1), and may implement some or all of the functionality of processor core voltage control module 107. Processing circuitry 200 includes global voltage regulator 202 and processor module 204. In the illustrated example, global voltage regulator 202 is external to the processor module 204. Processor module 204 includes integrated voltage regulators (iVRs) 208(1)-208(4) (collectively referred to as integrated voltage regulators 208), power efficiency monitor/controller (PEMC) 210, and processor cores/chiplets 220(1)-220(4). Although four integrated voltage regulators 208 and four processor cores/chiplets 220 are shown in FIG. 2, in other examples, a different number of these elements may be used.

Global voltage regulator 202 outputs a global input voltage, Vin, to each of the integrated voltage regulators 208 via communication link 206. Based on the received global input voltage, Vin, the integrated voltage regulators 208(1)-208(4) output a voltage regulator output voltage, Vout, to processor cores/chiplets 220(1)-220(4), respectively, via respective communication links 212(1)-212(4) (collectively referred to as communication links 212). Processor cores/chiplets 220 (1)-220(4) may send a Vout command to integrated voltage regulators 208(1)-208(4), respectively, via respective communication links 214(1)-214(4) (collectively referred to as communication links 214). In an example, the Vout command indicates a desired voltage regulator output voltage, Vout, to be provided to the processor core/chiplet. Communication links 218(1)-218(4) (collectively referred to as communication links 218) are coupled to communication links 214(1)-214(4), respectively, to provide the Vout commands from the processor cores/chiplets 220(1)-220(4), respectively, to the PEMC 210.

PEMC 210 is coupled to integrated voltage regulators 208(1)-208(4) via respective bidirectional communication links 216(1)-216(4) (collectively referred to as bidirectional communication links 216). Integrated voltage regulators 208(1)-208(4) send voltage regulator parameters to PEMC 210 via bidirectional communication links 216(1)-216(4), respectively, and also receive commands from PEMC 210 to adjust operational parameters of the integrated voltage regulators 208(1)-208(4). In some examples, the voltage regulator parameters sent from the integrated voltage regulators 208 to PEMC 210 include integrated voltage regulator current input, Iin, integrated voltage regulator current output, Iout, integrated voltage regulator voltage input, Vin, and integrated voltage regulator voltage output, Vout.

PEMC 210 is coupled to communication link 224 to communicate with other PEMCs.

In some examples, PEMC 210 performs a global efficiency analysis based on the voltage regulation parameters received from integrated voltage regulators 208 and the Vout commands received from processor cores/chiplets 220. Based on the global efficiency analysis, PEMC 210 outputs a global Vin adjustment signal to global voltage regulator 202 via communication link 222. Based on the received global Vin adjustment signal, global voltage regulator 202 adjusts the global Vin voltage output on communication link 206 to integrated voltage regulators 208.

In some examples, PEMC 210 provides dynamic monitoring and control across a plurality of processor cores/chiplets 220 at the system/board/module level to adjust the global Vin and other integrated voltage regulator parameters for overall power efficiency optimization. In some examples, the operating conditions for the processor cores/chiplets 220 are continuously monitored by PEMC 210, and the most efficient global Vin and downstream voltage regulation parameters are dynamically and algorithmically adjusted across all processor cores/chiplets 220. Some examples allow for the dynamic control of the global Vin by PEMC 210, and monitoring by the PEMC 210 of the processor core/chiplet 220 input voltage (i.e., integrated voltage regulator 208 output voltage), input current drawn from each individual integrated voltage regulator 208 by each individual processor core/chiplet 220, along with integrated voltage regulator 208 input current and feedback information from each integrated voltage regulator 208. This information may be used by the PEMC 210 to determine the weighted efficiency of each integrated voltage regulator 208 at each processor core/chiplet 220, in real time. Each processor core/chiplet 220 may still dynamically adjust its own integrated voltage regulator 208 output voltage as needed (e.g., based on workload and silicon process via the Vout command using communication links 214), while the PEMC 210 may dynamically vary the global Vin (and optionally other integrated voltage regulator 208 operational parameters) for optimizing overall system conversion efficiency across the sum of all processor cores/chiplets 220 within the system.

FIG. 3 sets forth a flowchart of an example method 300 for global processor core voltage control through integrated voltage regulation according to aspects of the present disclosure. In a particular embodiment, the method 300 is performed utilizing processing circuitry 200 (FIG. 2). The method 300 includes outputting 302, from an integrated voltage regulator to a processor core based on a global input voltage, a regulator output voltage. The method 300 includes receiving 304, by a power efficiency monitor and control circuit from the integrated voltage regulator, voltage control parameters. The method 300 includes controlling 306 a global voltage regulator with the power efficiency monitor and control circuit based on the received voltage control parameters to cause an adjustment to the global input voltage.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for global processor core voltage control through integrated voltage regulation, the method comprising:

outputting, from an integrated voltage regulator to a processor core based on a global input voltage, a regulator output voltage, the global input voltage being outputted, by a global voltage regulator, to a plurality of integrated voltage regulators that include the integrated voltage regulator;

receiving, by a power efficiency monitor and control circuit from the integrated voltage regulator, voltage control parameters, wherein the power efficiency monitor and control circuit determines a weighted efficiency of the integrated voltage regulator, at each processor core, based on input current and feedback information from the integrated voltage regulator; and controlling the global voltage regulator with the power efficiency monitor and control circuit based on the voltage control parameters to cause an adjustment to the global input voltage to obtain an adjusted global input voltage, wherein the adjusted global input voltage is provided to the plurality of integrated voltage regulators.

2. The method of claim 1, wherein the voltage control parameters include current input and output and voltage input and output of the integrated voltage regulator.

3. The method of claim 1, and further comprising:

receiving, by the integrated voltage regulator and the power efficiency monitor and control circuit from the processor core, a command indicating a desired regulator output voltage; and controlling the global voltage regulator with the power efficiency monitor and control circuit based on the voltage control parameters and the command indicating a desired regulator output voltage to cause the adjustment to the global input voltage.

4. The method of claim 1, and further comprising:

outputting, by the power efficiency monitor and control circuit to the integrated voltage regulator, operational parameters for the integrated voltage regulator.

5. The method of claim 4, wherein the voltage control parameters and operational parameters are exchanged between the power efficiency monitor and control circuit and the integrated voltage regulator via a bidirectional bus.

6. The method of claim 1, wherein the integrated voltage regulator, processor core, and power efficiency monitor and control circuit are implemented in a processor module, and wherein the global voltage regulator is external to the processor module.

7. The method of claim 1, wherein the power efficiency monitor and control circuit performs a global efficiency analysis based on the voltage control parameters to determine the adjustment to the global input voltage.

8. The method of claim 1, and further comprising:

outputting, from each of a plurality of integrated voltage regulators to a respective one of a plurality of processor cores based on the global input voltage, a respective regulator output voltage;

receiving, by the power efficiency monitor and control circuit from each of the integrated voltage regulators, respective voltage control parameters; and controlling the global voltage regulator with the power efficiency monitor and control circuit based on the voltage control parameters received from each of the integrated voltage regulators to cause the adjustment to the global input voltage.

9. An apparatus for global processor core voltage control through integrated voltage regulation, the apparatus comprising:

an integrated voltage regulator to output a regulator output voltage to a processor core based on a global input voltage; and a power efficiency monitor and control circuit to receive voltage control parameters from the integrated voltage regulator, and control a global voltage regulator based on the voltage control parameters to cause an adjustment to the global input voltage to obtain an adjusted global input voltage, wherein the adjusted global input voltage is provided to a plurality of integrated voltage regulators including the integrated voltage regulator.

10. The apparatus of claim 9, wherein the voltage control parameters include current input and output and voltage input and output of the integrated voltage regulator, and wherein the power efficiency monitor and control circuit performs a global efficiency analysis based on the voltage control parameters to determine the adjustment to the global input voltage.

11. The apparatus of claim 9, wherein the integrated voltage regulator and the power efficiency monitor and control circuit are to receive from the processor core a command indicating a desired regulator output voltage, and wherein the power efficiency monitor and control circuit is to control the global voltage regulator based on the voltage control parameters and the command indicating a desired regulator output voltage to cause the adjustment to the global input voltage.

12. The apparatus of claim 9, wherein the power efficiency monitor and control circuit is to output to the integrated voltage regulator, operational parameters for the integrated voltage regulator.

13. The apparatus of claim 12, wherein the voltage control parameters and operational parameters are exchanged between the power efficiency monitor and control circuit and the integrated voltage regulator via a bidirectional bus.

14. The apparatus of claim 9, wherein the integrated voltage regulator, processor core, and power efficiency monitor and control circuit are implemented in a processor module, and wherein the global voltage regulator is external to the processor module.

15. The apparatus of claim 9, wherein the power efficiency monitor and control circuit performs a global efficiency analysis based on the received voltage control parameters to determine the adjustment to the global input voltage.

16. The apparatus of claim 9, and further comprising:

a plurality of integrated voltage regulators to output a respective regulator output voltage to a respective one of a plurality of processor cores based on the global input voltage, and wherein the power efficiency monitor and control circuit is to receive from each of the integrated voltage regulators, respective voltage control parameters, and wherein the power efficiency monitor and control circuit is to control the global voltage regulator based on the received voltage control parameters from each of the integrated voltage regulators to cause the adjustment to the global input voltage.

17. A system for global processor core voltage control through integrated voltage regulation, the system comprising:

a global voltage regulator to generate a global input voltage; and a processor module coupled to the global voltage regulator, the processor module comprising:

one or more processor cores;

one or more integrated voltage regulators to output a regulator output voltage to a respective one of the one or more processor cores based on the global input voltage; and a power efficiency monitor and control circuit to receive voltage control parameters from the one or more integrated voltage regulators, and control the global voltage regulator based on the received voltage control parameters to cause an adjustment to the global input voltage to obtain an adjusted global input voltage, wherein the adjusted global input voltage is provided to the one or more integrated voltage regulators.

18. The system of claim 17, wherein the one or more processor cores include a plurality of processor cores, wherein the one or more integrated voltage regulators include a plurality of integrated voltage regulators, and wherein the voltage control parameters include current input and output and voltage input and output of the plurality of integrated voltage regulators.

19. The system of claim 17, wherein the one or more integrated voltage regulators and the power efficiency monitor and control circuit are to receive from the one or more processor cores a command indicating a desired regulator output voltage, and wherein the power efficiency monitor and control circuit is to control the global voltage regulator based on the voltage control parameters and the command indicating a desired regulator output voltage to cause the adjustment to the global input voltage.

20. The system of claim 17, wherein the power efficiency monitor and control circuit is to output to the one or more integrated voltage regulators, operational parameters for the one or more integrated voltage regulators.

* * * * *